US006449549B1

United States Patent
Dick

(10) Patent No.: US 6,449,549 B1
(45) Date of Patent: Sep. 10, 2002

(54) COMPARITOR LOGIC CONTROL SYSTEM AND METHOD FOR A CLUTCH

(76) Inventor: Joseph Adam Dick, 2161 Lake Debra Dr., #1724, Orlando, FL (US) 32835

( * ) Notice: Subject to any disclaimer, the term of this patent is extended or adjusted under 35 U.S.C. 154(b) by 0 days.

(21) Appl. No.: 09/464,765

(22) Filed: Dec. 16, 1999

(Under 37 CFR 1.47)

(51) Int. Cl.$^7$ ................ B60K 17/34; B60K 17/344; F16H 3/44
(52) U.S. Cl. ................ 701/67; 701/69; 701/89; 180/233
(58) Field of Search ................ 701/67, 69, 89, 701/93; 180/233, 248, 249, 197; 192/12 R

(56) References Cited

U.S. PATENT DOCUMENTS

| | | | |
|---|---|---|---|
| 4,937,750 A | | 6/1990 | Gillian .................. 364/424.1 |
| 5,105,131 A | * | 4/1992 | Schap .................. 318/282 |
| 5,490,487 A | * | 2/1996 | Kato et al. .................. 123/399 |
| 5,492,194 A | | 2/1996 | McGinn et al. .................. 180/233 |
| 5,740,083 A | * | 4/1998 | Anderson et al. .................. 364/565 |
| 5,842,947 A | * | 12/1998 | Weilant .................. 475/323 |
| 5,927,426 A | * | 7/1999 | Hall et al. .................. 180/249 |
| 6,066,065 A | * | 5/2000 | Breen .................. 475/312 |

* cited by examiner

*Primary Examiner*—Tan Nguyen
*Assistant Examiner*—Dalena Tran
(74) *Attorney, Agent, or Firm*—Liniak, Berenato, Longacre & White

(57) ABSTRACT

A microcomputer-based electronic control system for a full time four wheel drive torque transfer case monitors the relative slip between the front and rear output shafts of the transfer case, and generates a signal to engage an electromagnetic clutch for a predetermined time period in the event a predetermined slip threshold is exceeded. The control system continuously interrogates two Hall effect sensors positioned over toothed wheels on the front and rear outputs of the transfer case. Tooth counts are stored in two numerical stacks (one for each sensor), the depth of which may be adapted to the requirements of the particular design. Upon detecting a tooth count, the system adds the count to the sensor's current stack register and pushes all of the registers of the other stack down one register. The last register is pushed out or deleted from the stack memory. In this way, the system retains a continuous memory of tooth counts from one sensor for the last 'n' tooth counts of the other, and vice-versa. By comparing the sum of the tooth counts from each stack, the relative rotation of one shaft to the other shaft is directly ascertained independent of any time-based reference. Thus, the system detection relative rotational differences at all speeds down to zero rpms. In addition, because of an equal probability of missing tooth counts, the system works well above the maximum sampling rate of the system.

8 Claims, 3 Drawing Sheets

COMPARITOR LOGIC CONTROL SYSTEM AND METHOD FOR A CLUTCH

BACKGROUND OF THE INVENTION a) Field of the Invention

The present invention relates generally to an electronic control for a vehicle four wheel drive system and, in particular, to an electronic control which includes means for detecting a predetermined slip (speed differential) between the front and rear wheels of the vehicle, and means for selectively engaging a clutch during excessive slip conditions to prevent relative slip between the front and rear wheels.

b) Description of Related Art

Four wheel drive systems for vehicles are becoming increasingly common. In the past, such systems typically included torque transfer case having an input shaft connected to the output of the vehicle driver for selecting front and rear output shafts connected to the front and rear differentials of the vehicle for driving the front and rear wheels respectively. Typically, such systems were provided with selective control means operable by the vehicle driver for selecting whether the vehicle is to be operated in either a two wheel or a four wheel drive mode. When operated in the four wheel drive mode, these systems did not provide for any speed differentiation between the front and rear wheels such that, on dry pavement, "hopping" of the front wheels would occur during turning of the vehicle, due to the normal overspinning of the front wheels. Consequently, it was recommended that the four-wheel mode be used only during wet, icy, or low traction road surface conditions.

Recently, certain vehicles have been provided with a "full time" four wheel drive system. In these systems, the torque transfer cases are typically provided with an interaxle differential for dividing torque between the vehicle front and rear differentials. The interaxle differential enables the front and rear wheels to rotate at different speeds, which occurs during turning of the vehicle, or in the event the front and rear wheels have different diameter tires. Also, in order to prevent excessive slipping between the front and rear wheels, these transfer cases typically include a selectively engageable clutch means which is operative to lock the interaxle differential upon sensing a predetermined slippage between the front and rear output shafts of the transfer case.

However, the automatic control systems for these selectively engageable clutches has many drawbacks that increase cost without provide accurate and efficient activation of the selectively engageable clutches.

Current torque coupling clutch control systems require separate algorithms to perform low-speed and high speed detection of wheel slip. Moreover, current control systems provide only periodic sampling of rotational speeds differences in the torque coupling transmission.

Current control systems also do not permit modularization of the control system, allowing processing and decision making to be broken up onto separate, smaller processors that would be required if all of the processing occurred at one central processor.

The need therefore exists for a torque coupling control system that overcomes the drawbacks inherent in the prior art, while providing a controller that performs low and high speed detection of wheel slip with a single algorithm that continuously assesses operation of the drivetrain.

SUMMARY OF THE INVENTION

The present invention concerns a microcomputer-based electronic control system for automatically controlling a full-time four wheel drive torque transfer case or similar drivetrain device. The transfer case includes an input shaft coupled to the output of the vehicle transmission, and an interaxle planetary gear differential for dividing torque between a rear output shaft connected to the vehicle rear differential and a front output shaft connected to the vehicle front differential. An electromagnetic clutch is located in the transfer case and is adapted to selectively lock the planetary gear differential to prevent relative slip between the front and rear output shafts.

In accordance with the present invention, the electronic control utilizes a pair of Hall effect sensors for monitoring the speed of the front and rear output shafts. When a predetermined amount of slip is detected between the front and rear output shafts, the electronic control is operative to selectively engage the electromagnetic clutch for a predetermined time period. During this predetermined time period, the clutch is engaged to lock the differential and prevent slip between the front and rear output shafts.

The electronic control of the present invention includes several unique operating features. For example, the system of this invention is capable of detecting the relative rotational displacement of one shaft with respect to another at all speeds down to zero revolutions per minute.

The control system continuously interrogates two Hall effect sensors positioned over toothed wheels on the front and rear outputs of the transfer case. Tooth counts are stored in two numerical stacks (one for each sensor), the depth of which may be adapted to the requirements of the particular design. Upon detecting a tooth count, the system adds the count to the sensors current stack register and pushes all of the registers of the other stack down one register. The last register is pushed out or deleted from the stack memory. In this way, the system retains a continuous memory of tooth counts from one sensor for the last 'n' tooth counts of the other, and vice-versa. By comparing the sum of the tooth counts from each stack, the relative rotation of one shaft to the other shaft is directly ascertained independent of any time-based reference. Thus, the system detection relative rotational differences at all speeds down to zero rpms. In addition, because of an equal probability of missing tooth counts, the system works well above the maximum sampling rate of the system.

The system of this invention further permits modularization of the controller, thus allowing the processing and decision-making function to be broken up onto separate, smaller processors than would be required if all of the processing occurred on one central processor. This modularization may decrease the overall cost of the control system.

The above features, as well as other advantages of the present invention, will become readily apparent to one skilled in the art from reading the following detailed description in conjunction with the attached drawings.

DESCRIPTION OF THE PREFERRED EMBODIMENT

Figure 1:
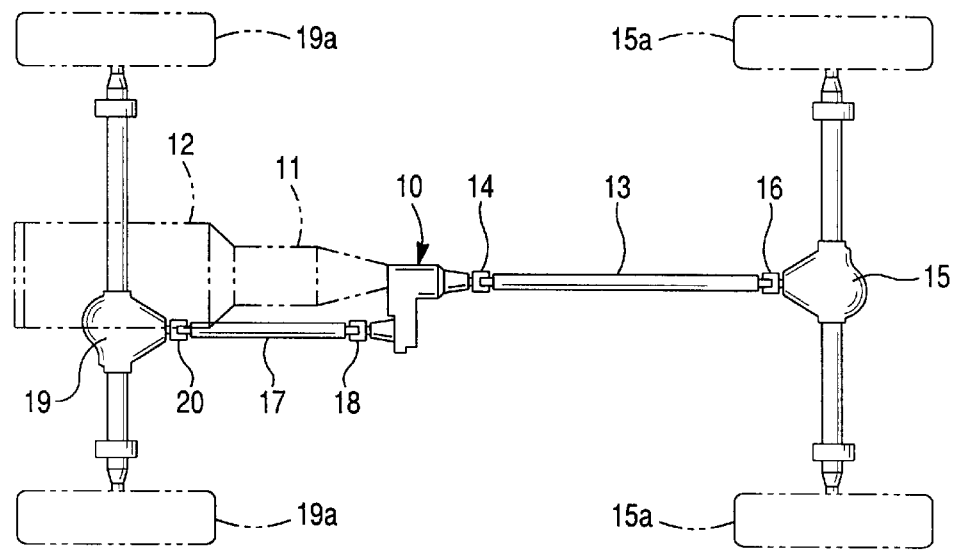
FIG. 1 is a top plan view of a four wheel drive system having a torque transfer case which can be controlled with the electronic control of the present invention.

Referring first to FIG. 1, there is shown a vehicle four wheel drive system which utilizes a torque transfer case 10 which can be controlled by the electronic control of the present invention. The transfer case 10 is secured to the rear of a transmission unit 11 (shown in phantom) which in turn is coupled to a drive engine 12 (also in phantom). The transmission 11 is provided with an output shaft which is coupled to an input shaft of the transfer case 10. The transfer case 10 transfer torque to the front and rear output shafts. The rear output shaft is connected to the front end of a rear drive shaft 13 by means of a conventional universal joint coupling 14. The rear end of the drive shaft 13 is coupled to an input shaft of a rear differential 15 by means of a universal joint coupling 16. The rear differential 15 is adapted to divide torque from the drive shaft 13 between the rear wheels 15a. The front output shaft which is connected to the front drive shaft 17 by means of a universal joint coupling 18. The front drive shaft 17 has a front end connected to an input shaft of a front differential 19 by means of a universal joint coupling 20. The front differential is adapted to divide torque received from the drive shaft 17 between the vehicle front wheels 19a.

Figure 2:
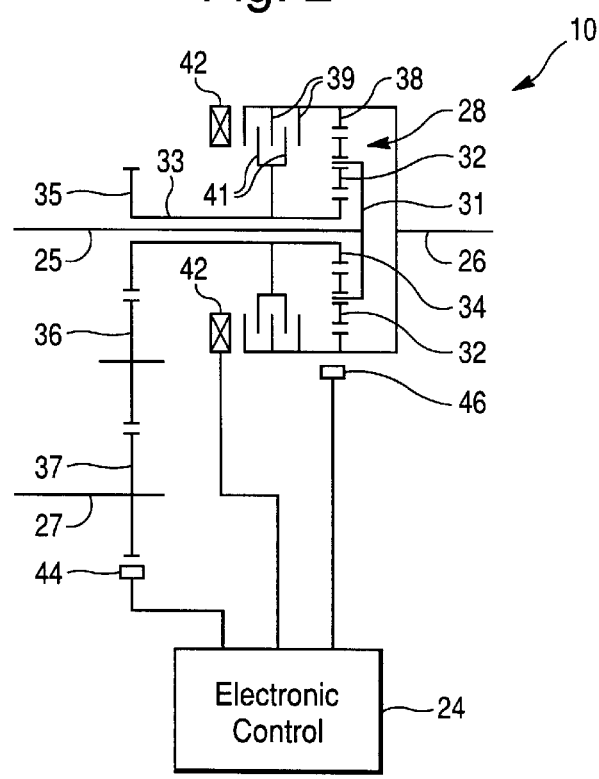
FIG. 2 is a schematic view illustrating the internal components of a transfer case which can utilize the electronic control of the present invention.

Referring now to FIG. 2, the internal components of the transfer case 10 are schematically shown, along with certain electrical connections to an electronic control which is represented in FIG. 2 as a block 24. As shown in FIG. 2, the transfer case 10 includes an input shaft 25 coupled to the output shaft of the vehicle transmission 11 (shown in FIG. 1). The transfer case 10 also includes a rear output shaft 26 adapted to be connected to the rear drive shaft 13, and a front output shaft 27 for connection to the front drive shaft 17. The transfer case utilizes an interaxle planetary gear differential, generally indicated by the reference numeral 28, for dividing torque between the rear output shaft 26 and the front output shaft 27. Also, an electromagnetic friction clutch, generally represented by the reference numeral 29, is provided for selectively locking the planetary gear differential to prevent any slip between the front and rear output shafts.

In particular, the input shaft 25 is secured to a planet carrier 31 which carries a plurality of circumferentially spaced and individually rotatable planet gears 32. A sleeve member 33 is rotatably mounted about the input shaft 25 and has one end which carries a sun gear 34 of the planetary gear differential 28 and an opposite end which carries a first output gear 35. The first output gear is connected to drive a second intermediate output gear 36 which in turn drives a third output gear 37 secured to the front output shaft 27. A ring gear 38 of the planetary gear differential 28 is secured to the rear output shaft 26.

The electromagnetic clutch assembly 29 includes a first group of clutch plates 39 which are secured for rotation with the ring gear 38, and a second group of clutch plates 41 which are secured to the sleeve member 33 for rotation with the sun gear 34. An annular clutch coil 42 is positioned adjacent the clutch plates 39 and 41 and is adapted to receive a clutch engagement signal from the electronic control 24. The electromagnetic clutch 29 has a construction wherein, when a clutch engagement signal is generated to energize the coil 42, the magnetic field generated by the energized coil 42 exerts a magnetic force to urge the clutch plates 39 and 41 into frictional engagement with one another to prevent relative rotation therebetween, thus locking the sun gear 34 and the ring gear 38 together. This prevents any relative slip between the front and rear output shafts.

The speed of the front output shaft is monitored by a speed sensor 44 which can be positioned adjacent the periphery of the teeth of the front output gear 37 or any suitable tone wheel. The speed sensor 44 generates a front output shaft speed signal to the electronic control 24. Similarly, the speed of the rear output shaft 26 is monitored by a speed sensor 46 which can be positioned adjacent the periphery of the ring gear 38 or any suitable tone wheel, and can be adapted to sense a plurality of circumferential speed external teeth provided about the periphery of the ring gear. The speed sensor 46 generates a rear output shaft speed signal to the electronic control 24.

As previously mentioned, the planetary gear differential 28 is provided for dividing torque between the rear output shaft 26 and the front output shaft 27. Normally, the clutch coil 42 is not energized such that a predetermined slippage can occur between the front and rear output shafts to accommodate slightly different front and rear wheel speeds which occur during normal traction conditions such as when turning the vehicle. However, as will be discussed in more detail below, when slippage between the front and rear wheels exceeds a predetermined amount, the electronic control 24 will generate a clutch engagement signal which causes the planetary gear differential to lock and provide a direct drive connection between the input shaft 25 and the front and rear output shafts 26 and 27. In particular, when the clutch coil 42 is energized, the ring gear 38 is locked relative to the sun gear 34 to prevent relative rotation therebetween. When the ring gear 38 is locked relative to the sun gear 32, the planet gears 32 are prevented from rotating about their associated shafts, thereby preventing rotation of the planet carrier 31 relative to either the ring gear 38 or the sun gear 34.

It should be noted that the transfer case illustrated in FIG. 2 is only one example of a transfer case which can utilize the electronic control of the present invention, and that other transfer cases which use a selectively engageable clutch means can be operated by the electronic control 24.

Figure 3:
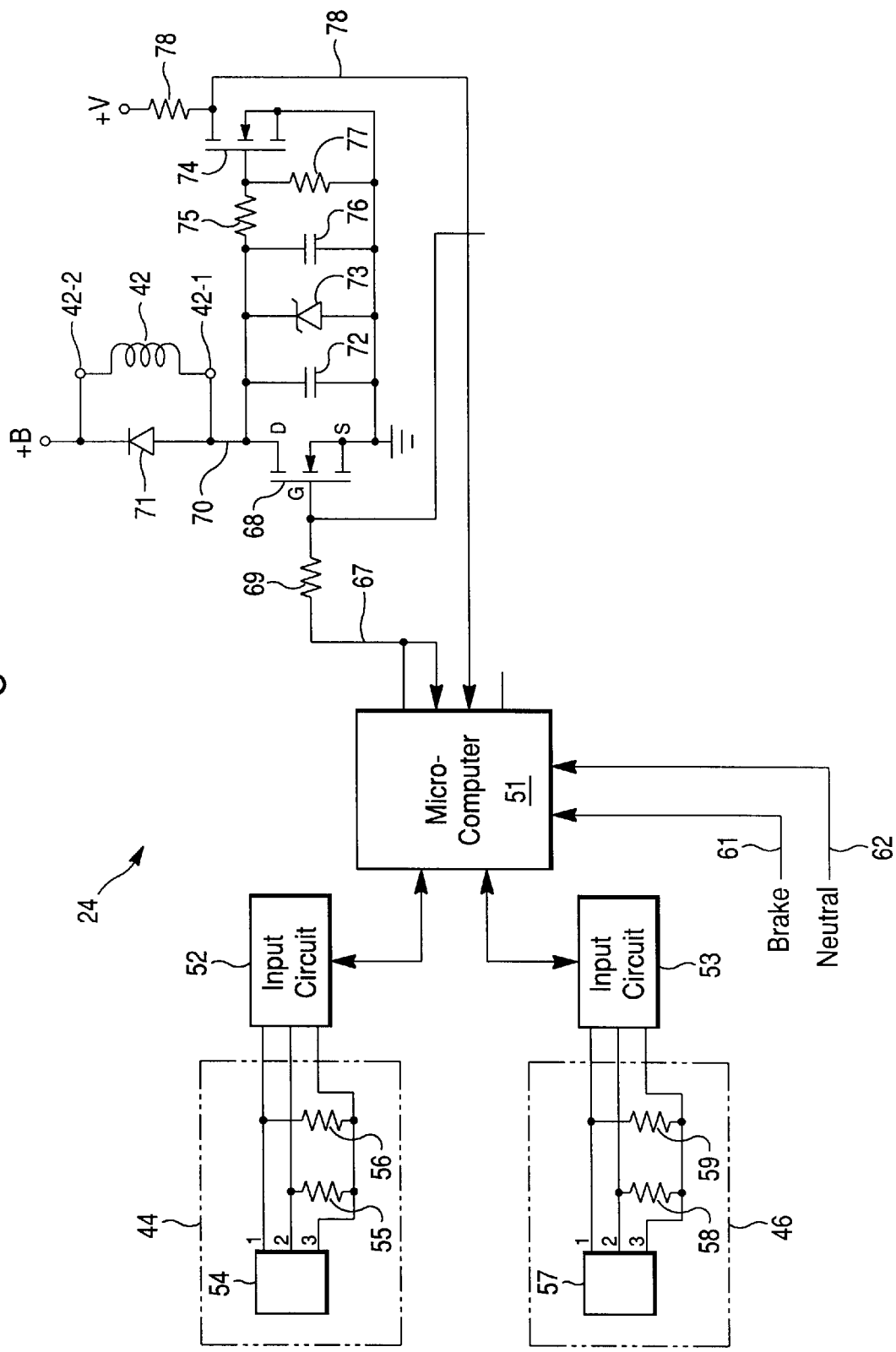
FIG. 3 is a flow diagram which illustrates the operation of the electronic control of the present invention in automatically controlling the transfer case of FIG. 2.

The electronic control 24 is centered around a microcomputer 51 (see FIG. 3). The front speed sensor 44 is connected to the microcomputer 51 through an input circuit 52 which conditions the output signal from the sensor 44 prior to supplying the signal to the microcomputer 51. Similarly, the rear speed sensor 46 is connected to the microcomputer 51 through an input conditioning circuit 53. While various types of commercially available speed sensors could be used with the present invention, it has been found that it is preferable to use a Hall effect device as the speed sensing unit. The Hall effect device functions as a digital switch and provides an output signal which alternates between a high and low logic level as the associated gear teeth or other actuating teeth cause the magnetic field through the switch to vary as the associated component rotates. While a conventional variable reluctance speed sensor could be utilized, it has been found that this type of sensor requires extra input conditioning circuitry and does not provide a clean, square wave form at low shaft speeds which is desirable with the present invention.

As shown in FIG. 3, the front speed sensor 44 includes a Hall effect device 54 having output terminals 54-1, 54-2 and 54-3, all of which are connected to the input circuit 52. Typically, the terminal 54-1 is connected to a regulated power supply source of a predetermined magnitude, while the terminal 54-3 is connected to the circuit ground potential. The output signal of the Hall effect device is generated at the terminal 54-2. In accordance with the present invention, a pair of internal resistors 55 and 56 are included in the speed sensor 44 and are connected across selected output terminals of the Hall effect device 54. In particular, the resistor 55 is connected between the terminals 54-2 and 54-3, while the resistor 56 is connected between the terminals 54-1 and 54-3. Thus, the entire sensor 44, including the Hall effect device 54, and the resistors 55 and 56, are located in the transfer case adjacent the periphery of the front output gear 37, as shown in FIG. 2.

Generally, the electronic control 24 is located within a separate housing which is external to the transfer case housing. For example, the electronic control can either be attached to an exterior portion of the transfer case or it can be located at another location on the vehicle. By incorporating the resistors 54 and 55 in the sensor 44, the microcomputer can generate signals to the input circuit 52 which enable the condition of the wiring up to the sensor to be checked. Otherwise, without the resistors 55 and 56, the diagnostic routine of the microcomputer 51 would not be able to distinguish between a fault in the sensor unit 44, or the wiring between the sensor 44 and the electronic control 24.

The rear speed sensor 46 has a construction similar to that of the front speed sensor 44. In 15 particular, the rear speed sensor 46 includes a Hall effect device 57 having output terminals 57-1, 57-2 and 57-3 connected to the input circuit 53. Also, an internal resistor 58 is connected between the terminal 57-2 and 57-3, while a second internal resistor 59 is connected between the terminals 57-1 and 57-3.

The microcomputer 51 is connected to generate a clutch engagement signal on a line 67. The line 67 is connected to the gate of a transistor 68 through a resistor 69. The source of the transistor 68 is connected to the circuit ground potential, while the drain of the transistor is connected to a terminal 42-1 of the clutch coil 42 by a line 70. The other terminal 42-2 of the coil 42 is connected to the vehicle +B power supply. Normally, the transistor 68 is maintained in an off state by generating a low level signal near ground potential on the line 67. When the transistor is off, the current flow through the clutch coil is sufficiently low such that the clutch is in its disengaged position. When a high level signal is generated on the line 67, the transistor 68 is turned on to place the clutch terminal 42-1 near ground potential, and enable sufficient current flow through the clutch coil 42 to thereby engage the clutch.

A diode 71, a capacitor 72, and a zener diode 73 are provided to protect the transistor 68 from voltage spikes and current surges which can occur when the transistor 68 is turned on and off. In particular, the diode 71 has an anode connected to the clutch coil terminal 42-1 and a cathode connected to the clutch coil terminal 42-2. The capacitor 72 is connected between the line 70 and the circuit ground potential, while the zener diode 73 has an anode connected to the circuit ground potential and a cathode connected to the line 70.

A transistor 74 is responsive to the level of the signal on the line 70. In particular, a resistor 75 is connected between the gate of the transistor 74 and the line 70. A filter capacitor 76 is connected between the line 70 and the circuit ground potential, while a biasing resistor 77 is connected between the gate of the transistor 74 and the circuit ground potential. The drain of the transistor 74 is connected to a regulated +V power supply through a resistor 78, while the source of the transistor 74 is connected to the circuit ground potential.

The level of the signal at the drain of the transistor 74 is supplied to the microcomputer 51 on a line 79. In operation, the transistor 74 provides a means of checking the continuity of the clutch coil 42. When the microcomputer is generating a low level signal on the line 67 such that the transistor 68 is off, the clutch is disengaged, and the line 70 will be at or near the +B voltage potential, providing that there is circuit continuity through the clutch coil 42. When the line 70 is at the +B potential, the high level signal supplied to the gate of the transistor 54 will turn on the transistor 74 to place the line 79 near the circuit ground potential. In the event there is discontinuity in the clutch coil 42, the level of the signal on the line 70 will not be sufficient to turn on the transistor 74, such that the line 79 will be at or near the +V potential. Thus, by monitoring the level of the signal on the line 79 prior to engaging the clutch, the microcomputer can determine whether there is continuity through the clutch coil.

Figure 4:
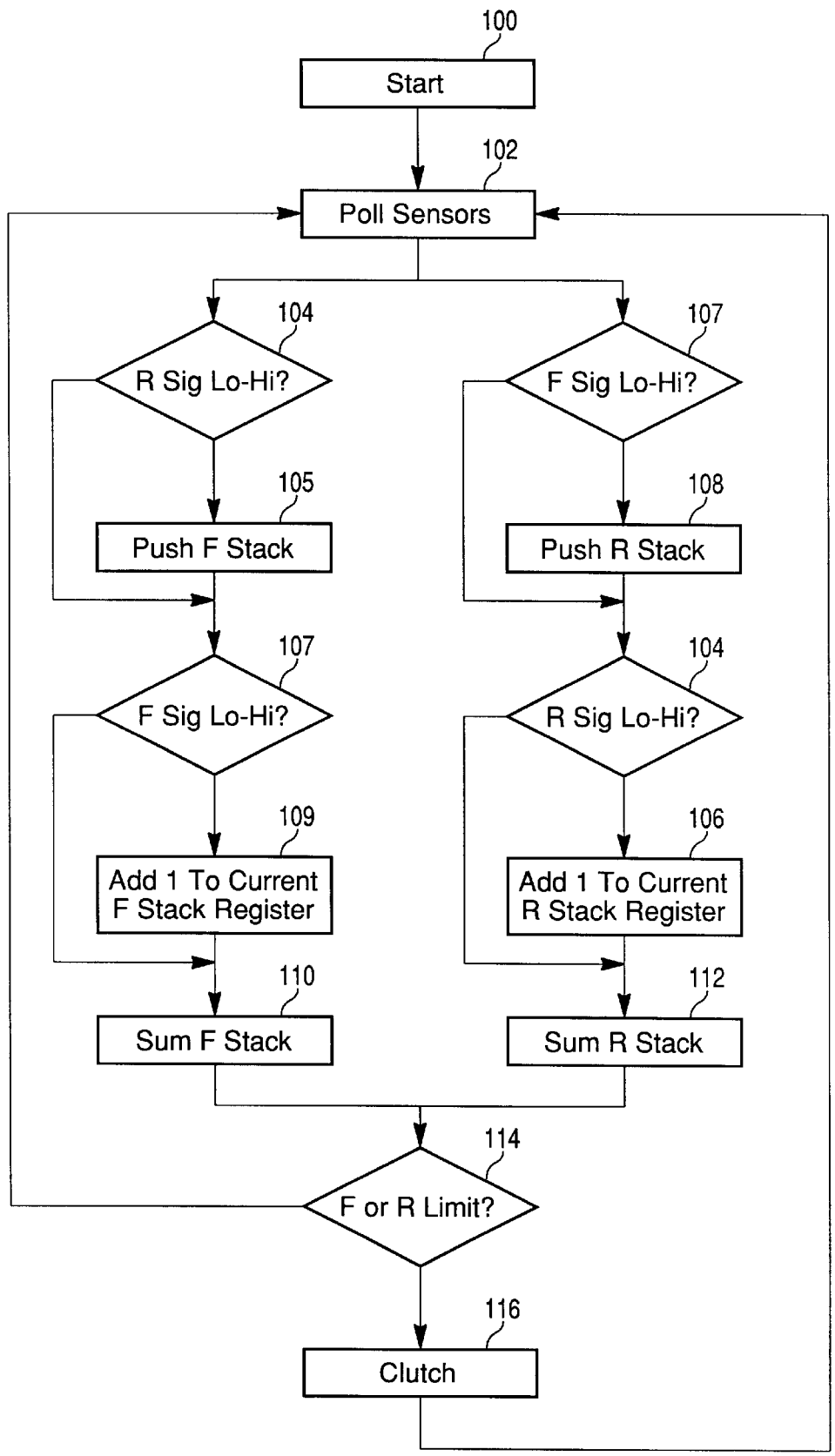
FIG. 4, there is shown a flow diagram which will be utilized to explain the operation of the electronic control.

Referring now to FIGS. 4, there is shown a flow diagram which will be utilized to explain the operation of the electronic control. The operation of the control is initiated at an oval 100 and then the system polls the sensors 44, 46 at step 102. If the rear sensor 46 detects a tooth count (step 104), the system pushes all of the registers of the front sensor's stack down one register (step 105) (the last register is pushed out or deleted), and the system adds the count to the rear sensor's current stack register (step 106). Likewise, if the front sensor 44 detects a tooth count (step 107), the system pushes all of the registers of the rear sensor's stack down one register (step 108) (the last register is pushed out or deleted), and the system adds the count to the front sensor's current stack register (step 109).

After a count is added to the front sensor's stack register (step 109), the system calculates the sum of the front stack register (step 110). Likewise, after a count is added to the rear sensor's stack register (step 106), the system calculates the sum of the rear stack register (step 112). Next, the system compares the sum of the tooth counts from each stack and calculates the relative rotational difference independent of any time-based reference (step 114). If a predetermined relative rotational difference is exceed (step 116), the system sends a signal to actuate the clutch pack of the transfer case 10.

Thus, the system detection relative rotational differences at all speeds down to zero rpms. In addition, because of an equal probability of missing tooth counts, the system works well above the maximum sampling rate of the system. The system of this invention further permits modularization of the controller, thus allowing the processing and decision-making function to be broken up onto separate, smaller processors than would be required if all of the processing occurred on one central processor. This modularization may decrease the overall cost of the control system.

The present invention has been illustrated and described in its preferred embodiment. However, it will be appreciated that the above described embodiment of the electronic control be modified without departing from the scope of the attached claims. For example, while the above discussed control is utilized to selectively control the engagement of an electromagnetic clutch, it will be appreciated that the electro-magnetic clutch can be replaced with either a hydraulically or other fluid actuated clutch which in turn can be controlled by electrically actuated solenoid valves.

What is claim is:

1. A method for controlling a torque transfer unit having a driven input shaft coupled to divide torque between first and second output shafts, the transfer unit including a selectively engageable clutch means responsive to an engagement signal for interconnecting said first and second shafts to prevent slip therebetween, said method comprising the steps of:

(a) generating first and second stack registers each comprising a plurality of registers stacked in sequential order;

(b) generating a first pulsed signal count wherein each pulse of said first pulsed signal count represents a predetermined amount of rotation of the first output shaft;

(c) adding said first pulsed signal count to said first stack register;

(d) eliminating a first count from said second stack register;

(e) generating a second pulsed signal count wherein each pulse of said second pulsed signal count represents a predetermined amount of rotation of the second output shaft;

(f) adding said second pulsed signal count to said second stack register;

(g) eliminating a second count from said first stack register;

(h) calculating a first sum total and a second sum total of said pulsed signal counts in said first and second stack registers, respectively;

(i) comparing the first and second sum total of the pulsed signal counts of each stack to thereby determine the relative rotational difference between said first and second output shafts; and (j) generating a clutch engagement signal if a count difference obtained in step (i) is equal to or greater than a predetermined value.

2. The method of claim 1, wherein said pulsed signal represents a tooth count of teeth disposed on said first and second output shafts.

3. The method according to claim 1, wherein the torque transfer case is used in a vehicle four-wheel drive system wherein the first output shaft is coupled to drive the vehicle front wheels and the second output shaft is coupled to drive the vehicle rear wheels, and said method includes the step of determining a road speed value representing the vehicle road speed.

4. The method of claim 1, wherein said relative rotational difference is determined independent of any time-based reference.

5. The method of claim 1, wherein said generating steps (b) and (e) include mounting a Hall effect sensor adjacent said first and second output shafts.

6. The method of claim 1, wherein said comparing step (i) may be accomplished at all rotational speeds down to zero revolutions per minute.

7. An electronic control for a vehicle four-wheel drive system including a torque transfer unit having a driven input shaft coupled to divide torque between first and second output shafts, the transfer unit including a selectively engageable clutch means responsive to an engagement signal for interconnecting said first and second output shafts to prevent relative slip therebetween, said control comprising:

first speed sensing means for generating a first pulsed speed signal representing the speed of the first output shaft, said first speed sensing means including a first Hall effect device positioned adjacent an annular toothed member secured to the first output shaft;

second speed sensing means for generating a second pulsed speed signal representing the speed of the second output shaft, said second speed sensing means including a second Hall effect device adjacent an annular toothed member secured to the second output shaft;

control means for maintaining a first stack and a second stack of said first and second pulsed speed signals, generating a sum total of said signals in said first and second stacks and comparing a sum total of each said first and second pulsed speed signals to determine whether an excessive slip condition has occurred, said control means operable to generate a clutch engagement signal to engage the clutch when an excessive slip condition has been detected wherein said control means eliminates a first count from said second stack after generating a first pulsed speed signal and eliminates a second count from said first stack after generating a second pulsed signal.

8. The control according to claim 7, wherein said control means is remotely located relative to said first speed sensing means, including wire means for connecting said first speed sensing means to said control means, and a resistor means internal to said first speed sensing means connected between selected terminals of said first Hall effect device to enable said control means to check the continuity of said wire means up to said first speed sensing means.

* * * * *